(12) United States Patent
Bedford

(10) Patent No.: US 6,871,853 B2
(45) Date of Patent: Mar. 29, 2005

(54) GAME WITH ACCUMULABLE TOKENS

(75) Inventor: Jonathan Bedford, Hawthorne, CA (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 10/286,543

(22) Filed: Nov. 1, 2002

(65) Prior Publication Data

US 2003/0085519 A1 May 8, 2003

Related U.S. Application Data

(60) Provisional application No. 60/340,007, filed on Nov. 1, 2001.

(51) Int. Cl.[7] ................................................ A63F 3/00
(52) U.S. Cl. ....................................... 273/243; 273/236
(58) Field of Search ................................. 273/236, 243, 273/254; D21/341, 342, 347

(56) References Cited

U.S. PATENT DOCUMENTS

| | | |
|---|---|---|
| 565,450 A | 8/1896 | Gibson |
| 990,918 A | 5/1911 | Stadler |
| 1,430,778 A | 10/1922 | Williams |
| 1,549,610 A | 8/1925 | Reisz |
| 1,819,932 A | 8/1931 | Walden |
| 1,870,395 A | 8/1932 | Zarin |
| 1,992,618 A | 2/1935 | Jeffreys |
| 3,767,201 A | 10/1973 | Harper et al. |
| 3,804,416 A | 4/1974 | Jones et al. |
| 4,128,246 A * | 12/1978 | Hicks et al. ................. 273/243 |
| 4,130,284 A | 12/1978 | Fuks |
| 4,333,654 A | 6/1982 | Allain |
| 4,349,973 A | 9/1982 | Penick et al. |
| 4,448,421 A * | 5/1984 | Zaruba et al. .............. 273/243 |
| 4,534,565 A | 8/1985 | Hube |
| 4,585,233 A | 4/1986 | Wilson |
| 4,648,601 A | 3/1987 | Carmichael |
| 4,781,384 A | 11/1988 | Bois |
| 4,861,040 A | 8/1989 | Peterson |
| 4,998,736 A * | 3/1991 | Elrod ........................ 273/249 |
| 5,022,681 A | 6/1991 | Penick |
| 5,049,078 A | 9/1991 | Thomsen |
| 5,096,204 A | 3/1992 | Lippman |
| 5,195,750 A | 3/1993 | Courialis |
| 5,213,507 A | 5/1993 | Ozrovitz |
| 5,228,698 A | 7/1993 | Dubarry, Jr. |
| 5,358,252 A | 10/1994 | McPhaul |
| 5,415,412 A | 5/1995 | McMahon |
| 5,443,268 A | 8/1995 | Mayfield et al. |
| 5,478,086 A | 12/1995 | Aylett |
| 5,562,520 A | 10/1996 | Pridonoff et al. |
| 5,678,819 A | 10/1997 | Underwood |
| 5,681,199 A | 10/1997 | Morris |
| 5,682,999 A | 11/1997 | Larson |
| 5,704,611 A | 1/1998 | Pierce |
| 6,120,029 A | 9/2000 | Carmichael et al. |
| 6,120,296 A * | 9/2000 | Lim .......................... 434/128 |
| 6,170,825 B1 | 1/2001 | Pflum |
| 6,176,486 B1 * | 1/2001 | Maciasz ..................... 273/243 |
| 6,203,017 B1 | 3/2001 | Schultz |
| 6,349,941 B1 * | 2/2002 | Cuss .......................... 273/243 |
| 6,488,283 B1 * | 12/2002 | Grundy ...................... 273/253 |
| 6,565,090 B2 * | 5/2003 | Aldridge .................... 273/254 |

* cited by examiner

*Primary Examiner*—Vishu Mendiratta
(74) *Attorney, Agent, or Firm*—Kolisch Hartwell, P.C.

(57) ABSTRACT

A game wherein players move their game pieces around a pathway collecting tokens from a plurality of stores while trying to avoid sharing a space with a commonly controlled chaser piece is described. Moreover, the game may be portable. In some cases, the game apparatus may be carried in a plastic case that resembles a hard-backed book. The game components may be based on an individual chapter from a published children's book or novel.

25 Claims, 2 Drawing Sheets

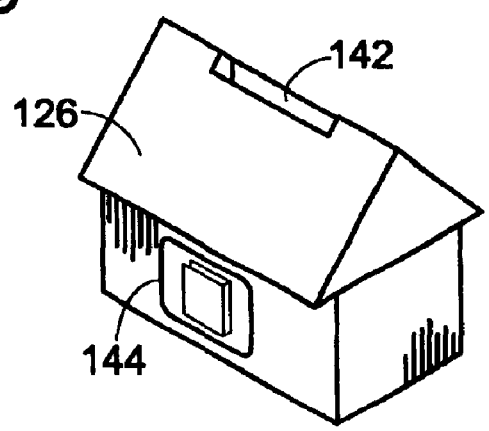
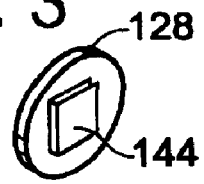
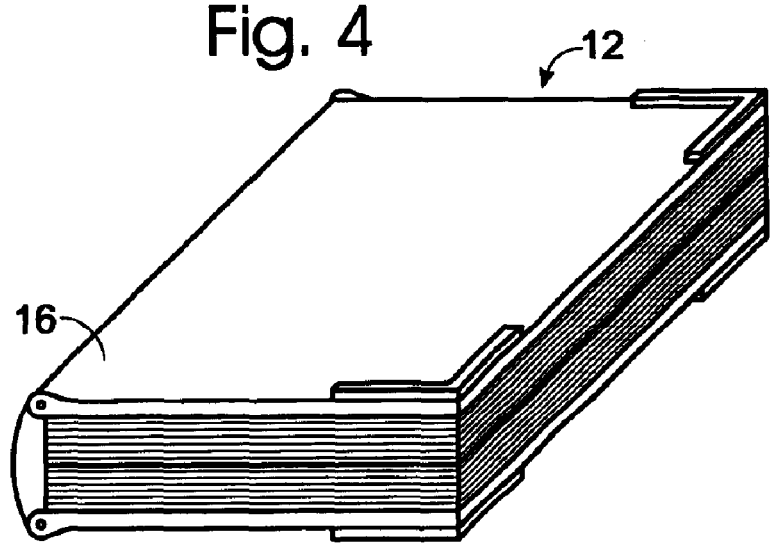

GAME WITH ACCUMULABLE TOKENS

CROSS-REFERENCE TO RELATED APPLICATIONS

This application is based upon and claims priority under 35 U.S.C. §119(e) to the following U.S. provisional patent application, which is incorporated herein by reference in its entirety for all purposes: Ser. No. 60/340,007 entitled "Book Based Games," filed Nov. 1, 2001.

FIELD OF THE INVENTION

The present invention relates generally to board games, and more specifically to board games that resemble a book when closed, and resemble a children's play set when open. The invention also includes various rules and apparatus for playing a board game, including games having multiple levels or room-like portions.

BACKGROUND OF THE INVENTION

Examples of board games that resemble a book are disclosed in U.S. Pat. Nos. 2,221,267, 3,880,429, 4,712,673, 4,781,384, 5,356,155, 5,961,149, and 6,203,017, and examples of board games that include multiple levels or room-like portions are disclosed in U.S. Pat. Nos. 3,767,201, 3,804,416, 4,333,654, 4,534,565, 5,195,750, 5,443,268, 5,678,819 and 6,170,825, the disclosures of all of which are incorporated by reference in their entirety for all purposes.

SUMMARY OF THE INVENTION

The present invention includes portable games carried in a plastic case that resembles a hard-backed book. Opening the book unfolds the game board. Various embodiments may be based on an individual chapter from a published children's book or novel.

Preferably, the housing and game board double as a play set, for use with detailed figures and environments.

The present invention further includes rules and apparatus for playing a board game in which players move their game pieces around a pathway collecting tokens from a plurality of stores while trying to avoid sharing a space with a commonly controlled chaser piece.

The advantages of the present invention will be understood more readily after a consideration of the drawings and the Detailed Description.

BRIEF DESCRIPTION OF THE DRAWINGS

FIG. 2 is a close-up of the stores shown in FIG. 1.

FIG. 3 is a close-up of the accumulable tokens shown in FIG. 1.

FIG. 4 is an isolated view of the housing of FIG. 1 in a closed position.

DETAILED DESCRIPTION AND BEST MODE OF THE INVENTION

Figure 1:
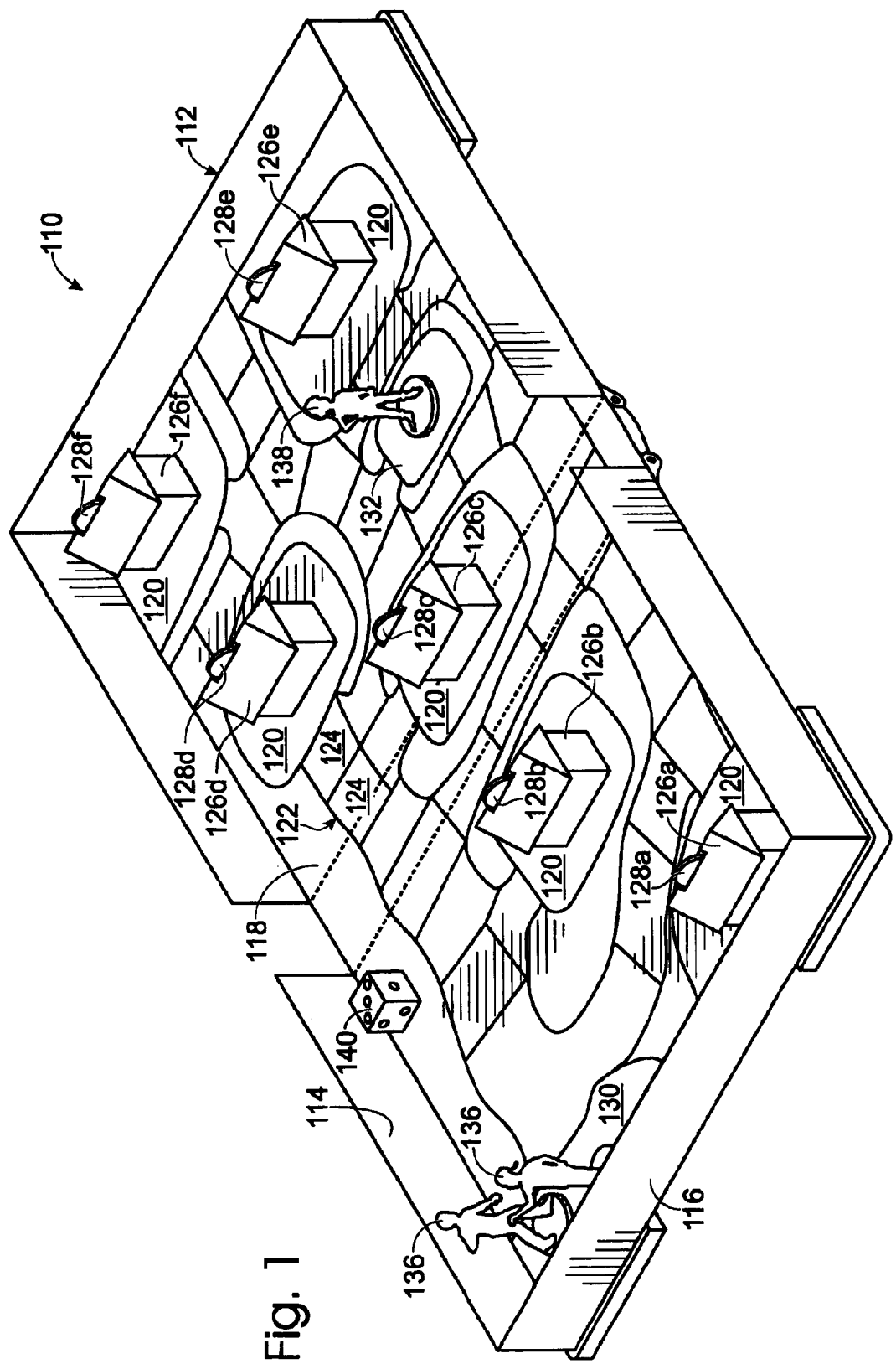
FIG. 1 depicts one embodiment of the game of the present invention, including a housing, playing surface, playing pieces, and accumulable tokens.

The present invention is a game played by at least two players involving strategy and chance. As will be understood, game 110 may incorporate elements from a particular theme or popular cultural phenomenon, such as a book or movie. In such a case, the elements of game 110 may include depictions, shapes, and colors that reflect or exemplify this theme or phenomenon. In particular, game 110 may be based on a particular portion of popular media, such as a chapter of a book or novel.

An exemplary embodiment of game 110 is shown in FIG. 1. Typically, game 110 includes a housing 112 having an inner surface 114 and an outer surface 116. Located on inner surface 114 is a game board 118. Game board 118 includes a number of store spaces 120. A pathway 122 made up of a number of connecting spaces 124 links the store spaces to each other. Each store space 124 is typically sized to accommodate a store 126 and a set of tokens 128. As shown, pathway 122 may further include a start/finish area 130 and a chaser start area 132.

Game 110 further includes a number of playing pieces 134 including a player mover 136 for each player, a commonly controlled chaser 138 and a random number generator, such as die 140.

As stated above, game 110 may be based on a particular piece of popular media such as a book or more. More particularly, game 110 may be based on a portion of the popular media piece such as a book chapter. In such a case, it may be desirable for game 110 to also be suitable for use as a play set. When used as a play set, game 110 may include play items based on those items and situations described in the book or other form of popular media. Furthermore, game 110 may include additional decorative items that are not used in game play according to the rules of the game.

In addition, some or all of the items used in game play may be suitable for use as part of the play set. For example, as shown in FIG. 2, each store 126 may be represented by a three dimensional replica of a store. Each store 126 may further include a receptacle 142 suitable for receiving each set of tokens 128. Examples of suitable tokens are shown in FIG. 3.

As stated above, game 110 may further include a housing 112 having an inner surface 114 and an outer surface 116. Typically, housing 112 is adapted to move from an open position, as shown in FIG. 4 to a closed position, as shown in FIG. 5. Generally, game board 118 is exposed for play when the housing is in the open position. The housing may resemble a book when in the closed position. Furthermore, the housing may be adapted to contain all of the playing components including the playing pieces and any decorative items not used in game play when in the closed position.

In one embodiment, the present invention provides rules for using the above-described apparatus wherein players may move their game pieces around the pathway collecting tokens from each of the stores. In addition, players may move a commonly controlled chaser piece and attempt to penalize their opponent by moving the chaser piece onto a square occupied by their opponent's playing piece.

As stated above, the game may be based on a well-known popular culture phenomenon, such as a book or movie. Accordingly, the example below is based on the popular children's book *Harry Potter and the Sorcerer's Stone*, by J. K. Rowlings.

An example of a set of rules for a game constructed in accordance with an embodiment of the present invention follows:

EXAMPLE I

Harry Potter and the Sorcerer's Stone™

Diagon Alley

Chapter Game

Contents
1 Mini Game Book 112

2 Hagrid & Harry Movers 136
1 Malfoy Mover 138
6 Stores 126: Gringotts 126*f*, Ollivanders 126*e*, Madam Malkins 126*d*, Eeylops Owl Emporium 126*c*, Flourish and Blotts 126*b*, Apothecary 126*a*
12 Tokens 128: 2 Owls 128*c*, 2 Cauldrons 128*a*, 2 Books 128*b*, 2 Wands 128*e*, 2 Robes 128*d*, 2 Coins 128*f*
1 Die 140
5 Customer Applied Labels (not shown)

Set Up

1. Unfold game board 112.
2. Affix the shop labels to the appropriate building, matching the indentation on the building with the label
3. Place 2 School Supply Tokens 128 in their respective buildings 126, matching the symbol 144 on the Token with the name of, or symbol 144 on, the building. Match them up as follows:
   Apothecary 126*a*: Cauldron Token 128*a*
   Flourish & Blotts 126*b*: Book Token 128*b*
   Gringotts 126*f*: Coin Token 128*f*
   Ollivanders 126*e*: Wand Token 128*e*
   Eeylops 126*c*: Owl Token 128*c*
   Madam Malkins 126*d*: Robe Token 128*d*
4. Place the 6 buildings 126 with their 2 Tokens 128 on the game board, matching the Token symbols 144 with the corresponding symbols on the game board, i.e., Place Eeylops on the Owl Symbol, etc.
5. Place the 2 Harry/Hagrid™ movers 136 on the Leaky Cauldron "Start" space 130.
6. Place the Malfoy mover 138 on Malfoy's Start place 132 in the center of the board.

Object

Make your way from the Leaky Cauldron (space 130) to Gringotts (i.e., the building space 120 on which the Gringott's building 126*f* is placed) and collect your Money Token 128*f*. Then visit each of the 5 remaining stores 126 (in any order) and collect 1 Token 128 from each store. The first player to collect all 6 Tokens and make it back to the Leaky Cauldron (space 130) is the winner. But don't bump into Malfoy (mover 138) because he'll take your Token(s).

Let's go Shopping

1. Player with the higher roll goes first.
2. On your turn you get to roll the die 140 twice. The first time (1–6) is for your mover (i.e. the Harry or Hagrid mover 136). The second roll (1–4) is for the Malfoy mover 138. If you roll a 5 or 6 you can't move the Malfoy mover. See below under "Details on the Malfoy Mover".
3. Move your mover or character out of the Leaky Cauldron (space 130) and head over to Gringotts (building 126*f*), following the game path (i.e. by moving your mover on spaces 124). You must collect your Gringotts Token 128*f* before you can continue shopping.
4. After you have collected your Gringotts Token 128*f*, visit the other 5 stores 126 (in any order you like) and collect 1 Token 128 from each store. Stack your Tokens in the order in which you collect them.
5. You must enter the stores using the staircase space 146 in front of each store.
6. You do not have to land in a store by exact count. But once you land in a store that is the end of your turn.
7. You can only move in one direction on your turn. No doubling back.
8. You can't share spaces on the game path. If you land on an occupied space, move to the next available space.
9. You can share a store space.
10. The Malfoy mover 138 doesn't have to land on the space on which your mover is located by exact count. See below under "Details on the Malfoy Mover".
11. If you bump into the Malfoy mover 138 or he bumps into you, in other words, if your mover and the Malfoy mover share a space 124 at any time, your mover is moved to the Malfoy Start space 132 and you must return your most recently purchased Token to its store of origin. If you don't have any Tokens your mover is sent back to the Leaky Cauldron "Start" space 130. The Malfoy mover 138 always stays on the space where he caught you.
12. You don't get your second "Malfoy" roll if Malfoy catches you.
13. After you have collected all 6 Tokens, make your way back to the Leaky Cauldron (space 130), avoiding encounters with Malfoy. You don't have to land at the Leaky Cauldron by exact count.
14. First player back to the Leaky Cauldron is the winner.

Details on the Malfoy Mover 138

1. You move the Malfoy mover 138 on your second roll. You can only move him if you roll a 1, 2, 3, or 4. If you roll a 5 or 6 he stays put.
2. Malfoy leaves his "Start" space 132 using the stairs (space 146*a*).
3. Malfoy can only move in one direction, no doubling back to catch your opponent.
4. Malfoy doesn't have to land on you by exact count. If you are in his way or he's blocking you, you're in trouble!
5. If Malfoy catches you (i.e. moves onto the space on which your mover is located), return your most recently "purchased" Token to its store of origin. Malfoy stays where he is (on the space where he caught you). Place your mover on Malfoy Start space 132. You also forfeit your second "Malfoy" role. Play continues with the next player.
6. The above rule also applies if you haven't yet purchased any school supplies (i.e. collected tokens 128*a*, 128*b*, 128*c*, 128*d*, 128*e*), but you do have your Gringotts Money Token 128*f*. You must return your Money Token 128*f* to Gringotts 126*f*. Malfoy stays where he is (on the space where he caught you). Place your mover on the Malfoy Start space 132. You also forfeit your second "Malfoy" roll. Play continues with the next player.
7. If Malfoy catches you but you don't have either Money (i.e. a token 128*f*) or Supply Tokens (i.e. tokens 128*a*–128*e*), then return your mover to the Leaky Cauldron start space 130. Malfoy stays where he is (on the space where he caught you).
8. Malfoy can't enter any of the stores. But if he's waiting outside, blocking your exit, the above rules apply.
9. You can't jump over the space on which the Malfoy mover is located.
10. Unless Malfoy lands on a space occupied by your mover or your opponent's mover, you must use all of your Malfoy moves. Move Malfoy the number of spaces as indicated on the die.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

Inventions embodied in various combinations and subcombinations of features, functions, elements and/or properties may be claimed in this or a related application. Such claims, whether they are directed to a different invention or directed to the same invention, whether different, broader, narrower or equal in scope to any original claims, are also regarded as included within the subject matter of the inventions of the present disclosure.

What is claimed is:

1. A game comprising:
   a gameboard having:
      a player start/finish space;
      a chaser start space;
      a plurality of store spaces; and
      a pathway of connecting spaces linking the player start/finish space, the chaser start space, and store spaces to each other;
   a plurality of stores located on the store spaces,
   at least one store-specific token for each store;
   a random number generator; and
   a plurality of playing pieces including
      a first player mover having distinguishable characteristics;
      a second player mover having distinguishable characteristics: and
      a commonly controlled chaser.

2. The game of claim 1 wherein each store is a three-dimensional figure shaped to resemble a building.

3. The game of claim 2 wherein each three-dimensional figure is adapted to receive one or more tokens.

4. The game of claim 3 wherein the three-dimensional figures shaped to resemble a building include a token-receiving receptacle sized to allow one or more tokens to be inserted into the receptacle with at least a portion of the inserted token being exposed to allow for removal of the token.

5. The game of claim 3 wherein the three-dimensional figures shaped to resemble a building include a building body and a roof having an apex, the roof including a token-receiving slot that is perpendicular to the apex of the roof, the slot being sized to receive at least a portion of one or more tokens.

6. The game of claim 1 wherein the number of tokens per store space is equal to the number of players playing the game.

7. The game of claim 1 wherein the game board is located on the inside of a housing, wherein the housing is movable from an open position to a closed position.

8. The game of claim 7 wherein the housing is adapted to contain the tokens, stores, random number generator, and playing pieces when the housing is in the closed position.

9. The game of claim 7 wherein the housing resembles a closed book when the housing is in the closed position.

10. The game of claim 1 where the gameboard includes first and second equally sized outer portions hingedly attached to a central portion.

11. The game of claim 10 where the first and second outer portions each further including an at least partial perimeter wall extending upwards from and perpendicular to the first and second playing fields.

12. The game of claim 1 wherein each store space includes distinct identifying indicia.

13. The game of claim 12 where each store includes distinct identifying indicia associating the store with a specific store space.

14. The game of claim 13 wherein each store-specific token includes identifying indicia associating the store-specific token with a specific store space.

15. The game of claim 1 wherein each store includes distinct identifying indicia.

16. The game of claim 15 wherein each store-specific token includes identifying indicia associating the store-specific token with a specific store.

17. A method for playing a game having a game board including a plurality of store spaces; a start/finish space; a chaser start space; a pathway of connecting spaces linking the store spaces, start/finish space, and chaser start space together; at least one store-specific token for each store space; a plurality of playing pieces including a mover for each player and a commonly controlled chaser, and a random number generator, the method comprising:
   moving the playing pieces on a game board in turns, wherein a first turn comprises:
      generating a first number with the random number generator;
      moving a first player mover the number of spaces indicated by the random number generator;
      generating a second number with the random number generator; and
      moving the commonly controlled chaser the number of spaces indicated by the random number generator; and
   a second turn comprises:
      generating a first number with the random number generator;
      moving a second player mover the number of spaces indicated by the random number generator;
      generating a second number with the random number generator; and
      moving the commonly controlled chaser the number of spaces indicated by the random number generator;
   penalizing a mover that is in the same space as the chaser;
   accumulating a store-specific token when a mover lands on a store space; and
   winning the game by accumulating one token from each store.

18. The method of claim 17 wherein the penalty is placing the mover on a start space.

19. The method of claim 18 wherein the start space is the start/finish space.

20. The method of claim 19 wherein the start space is the chaser start space.

21. The method of claim 17 wherein the penalty is returning an accumulated token.

22. The method of claim 21 wherein the token that is returned is the most recently accumulated token.

23. The method of claim 17 wherein the first turn comprises:
   rolling a die a first time and moving a first player mover according to the first die roll; and
   rolling the die a second time and moving the commonly controlled chaser according to the second die roll,
and the second turn comprises;
   rolling the die a first time and moving a second player mover according to the first die roll; and
   rolling the die a second time and moving the commonly controlled chaser according to the second die roll.

24. The method of claim 23 wherein during the first or second turns, the chaser is moved only when a subset of the total number of possible die outcomes is rolled.

25. The method of claim 17 further comprising requiring that a first predetermined store-specific token be collected before any other store-specific tokens can be collected.

* * * * *